(12) United States Patent
Liu et al.

(10) Patent No.: US 7,353,338 B2
(45) Date of Patent: Apr. 1, 2008

(54) CREDIT MECHANISM FOR MULTIPLE BANKS OF SHARED CACHE

(75) Inventors: Yen-Cheng Liu, Portland, OR (US); Krishnakanth Sistla, Hillsboro, OR (US); George Cai, Lake Oswego, OR (US); Ganapati Srinivasa, Portland, OR (US); Geeyarpuram Santhanakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 11/302,646

(22) Filed: Dec. 14, 2005

(65) Prior Publication Data

US 2007/0136531 A1 Jun. 14, 2007

(51) Int. Cl.
*G06F 12/00* (2006.01)

(52) U.S. Cl. .................... 711/130; 711/119
(58) Field of Classification Search ............ None
See application file for complete search history.

(56) References Cited

U.S. PATENT DOCUMENTS

| 6,754,775 | B2* | 6/2004 | Chaudhry et al. | 711/128 |
| 7,246,205 | B2* | 7/2007 | Balakrishnan et al. | 711/138 |
| 2004/0100907 | A1* | 5/2004 | Illikkal et al. | 370/235 |
| 2006/0136671 | A1* | 6/2006 | Balakrishnan et al. | 711/122 |

* cited by examiner

*Primary Examiner*—T Nguyen
(74) *Attorney, Agent, or Firm*—Caven & Aghevli LLC (57) ABSTRACT

Methods and apparatus to manage credits in a computing system with multiple banks of shared cache are described. In one embodiment, a credit request from a processor core is translated into a physical credit that corresponds to one of the multiple banks of shared cache.

30 Claims, 8 Drawing Sheets

CREDIT MECHANISM FOR MULTIPLE BANKS OF SHARED CACHE

BACKGROUND

The present disclosure generally relates to the field of electronics. More particularly, an embodiment of the invention relates to a credit mechanism utilized to access multiple banks of shared cache.

To improve performance, some processors utilize multiple cores on a single die. A die may also include a cache that can be shared by multiple cores. As additional cores are provided on the same die, a shared on-die cache may become a performance bottleneck. Some designs utilize circuitry within each core to manage the cores' shared cache access. Hence, each time a cache design changes, cores need to also be redesigned or re-floor planned. This may lengthen a processor's design cycle, or increase its design complexity.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Figure 1:
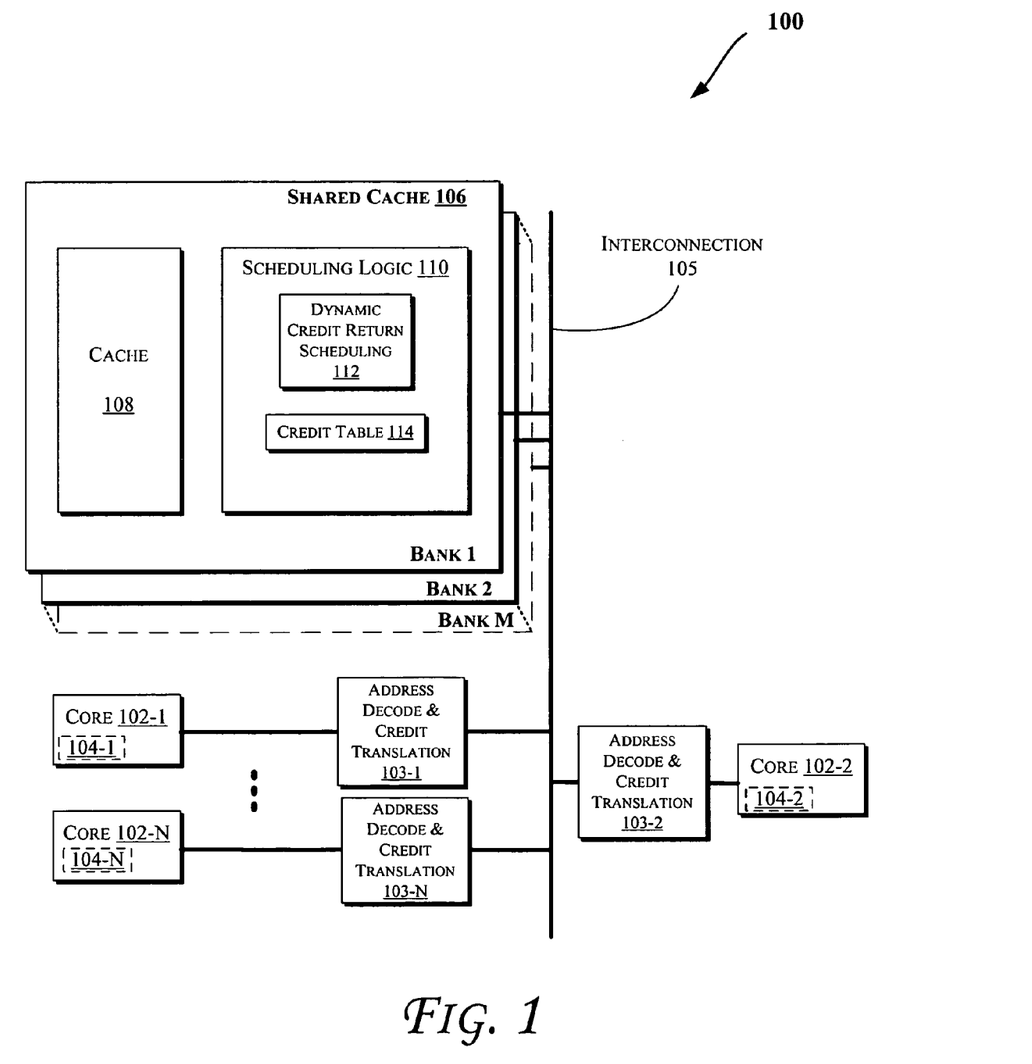
FIG. 1 illustrates a block diagram of a multiple core processor, according to an embodiment of the invention.

Some of the embodiments discussed herein may enable utilization of differing number of banks of shared cache, with no change to the design or layout of processor cores, such as the cores discussed with reference to FIGS. 1-8. More particularly, FIG. 1 illustrates a block diagram of a multiple core processor 100, according to an embodiment of the invention. The processor 100 may include one or more cores 102-1 through 102-N (generally referred to herein as "cores 102"). As shown in FIG. 1, the cores 102 may communicate with address decode and credit translation logics 103-1 through 103-N (generally referred to herein as "ADCT 103"). The ADCT 103 may decode addresses and/or translate memory credit requests received from the cores 102, for example, to translate virtual memory credits into physical memory credits, as will be further discussed herein, e.g., with reference to FIGS. 2-4. Generally, memory credits may be utilized by the cores 102 to determine the number of transactions in flight (e.g., the number of outstanding transactions each core may inject into a memory subsystem, such as the cache 106). In an embodiment, credits may be utilized to provide an optimized and/or fair mechanism of utilizing the shared cache (106) amongst the cores 102, as will be further discussed herein. In one embodiment, each of the cores 102 may include an optional credit pool to store the amount of credits available to the respective core (e.g., the credit pools 104-1 through 104-N, collectively referred to herein as "credit pools 104"). The credit pools 104 may be implemented by using a storage mechanism such as a counter, a hardware register, a variable stored in a shared memory (e.g., the shared cache 106), or other storage mechanisms.

The ADCT 103 may additionally communicate with an interconnection network or bus 105. Various components of the processor 100 may communicate via the bus 105. For example, one or more banks of shared cache 106 (e.g., banks 1 through M) may be in communication with the interconnection 105 to enable the cores 102 to store and/or load data (including instructions) to/from the shared cache 106. Additionally, the processor 100 may communicate with various system components via the shared cache 106, e.g., by utilizing an interconnection or bus (not shown), as will be further discussed with reference to FIGS. 7 and 8.

Each of the banks of shared cache (106) may include various components some of which are only shown in FIG. 1 with reference to bank 1 for clarity. Accordingly, each of the remaining banks of cache (e.g., banks 2 through M) may include the same or similar components shown with reference to bank 1. Additionally, some of the embodiments discussed herein are not limited to multiple core processors and may be applied in a single core processor.

In one embodiment, each bank of the shared cache 106 may include a cache 108 (which may be a static random access memory (SRAM) in one embodiment), a scheduling logic 110, a dynamic credit return scheduling (DCRS) logic 112, and/or a credit table 114. The cache 108 may store data (including instructions) that are utilized by one or more components of the processor 100. The cache 108 may be shared by the cores 102 or other components of the processor 100, for example. In various embodiments, the cache 108 may be a level 1 (L1) cache, a level 2 (L2) cache, a last level cache (LLC), or other types of cache. The scheduling logic 110 may provide for a fair and/or optimized distribution of credits between the cores 102, as will be further discussed herein. The DCRS logic 112 may determine how or whether to allocate available credits to the cores 102, e.g., by accessing the information stored in the credit table 114, as will be further discussed with reference to FIG. 5. In one embodiment, such as the embodiment shown in FIG. 1, the scheduling logic 110 may include the DCRS logic 112 and the credit table 114. However, the DCRS logic 112 and/or the credit table 114 may be provided in other locations. For example, the credit table 114 may be stored in the cache 108. Also, a single credit table 114 may be shared by one or more banks of the shared cache (e.g., one or more banks 1 through M of the shared cache 106).

In an embodiment, various components of the processor 100 may be implemented on a single integrated circuit chip or die. Moreover, the chip may include one or more shared or private caches (such as one or more banks of shared cache 106), interconnects (such as 105), memory controllers (such as those discussed with reference to FIGS. 7 and 8), or other components. In one embodiment, the cores 102 may be implemented on different dies and share the same socket.

Figure 2:
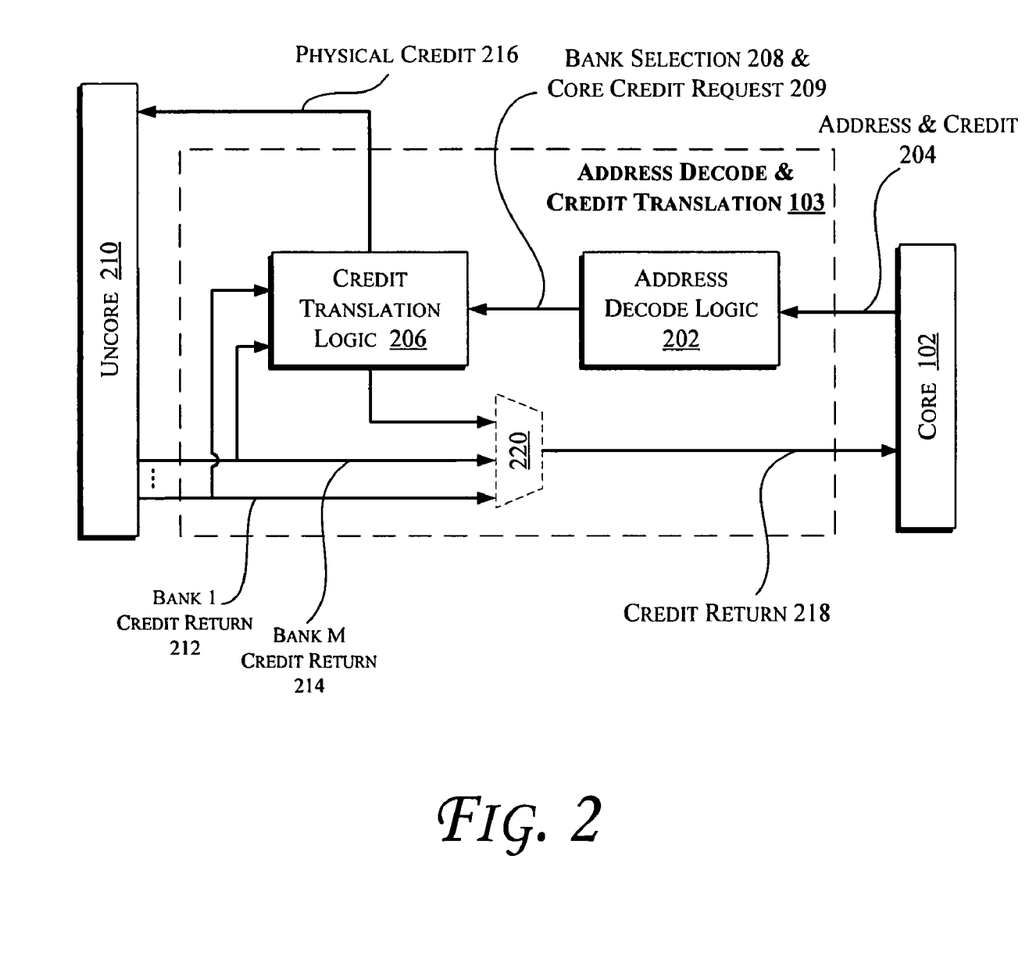
FIG. 2 illustrates a block diagram of an address decode and credit translation logic, according to an embodiment.

FIG. 2 illustrates a block diagram of an address decode and credit translation logic, according to an embodiment. In one embodiment, FIG. 2 illustrates further details of an embodiment of the ADCT 103 of FIG. 1. The ADCT 103 may include an address decode logic 202 that communicates with one of the processor cores 102 discussed with reference to FIG. 1 (referred to hereinafter as "core 102" for simplicity). The address decode logic 202 may decode an associated address of a request issued by the processor core 102. The core request may be provided through an address and credit signal 204. For example, the address decode logic 202 may decode the provided address (204) to determine the physical address corresponding to one of the banks of the shared cache 106 of FIG. 1. Furthermore, the address decode logic 202 may balance the traffic on the banks of shared cache (106) in one embodiment, as will be further discussed with reference to FIG. 5.

The ADCT 103 may also include a credit translation logic 206 to translate virtual credits (e.g., credits utilized by the cores 102) into physical credits (e.g., credits that correspond to actual physical identifiers associated with the banks of shared cache 106). In such an embodiment, the credit translation logic 206 may allow a core design and/or layout to remain unchanged, for example, as the design of the shared cache (e.g., number of banks of the shared cache 106) changes. In one embodiment, the cores 102 need not be redesigned (or re-floor planned) each time the number of banks of shared cache (106) changes. Hence, the cores 102 may not need to maintain an additional credit pool (or other credit management logic) corresponding to the additional banks of shared cache. Instead, the credit translation logic 206 may be redesigned such as discussed with reference to FIG. 3. The address decode logic 202 may generate and/or provide a bank selection signal 208 to the credit translation logic 206 (as will be further discussed with reference to FIG. 3) and a core credit request signal 209 (e.g., that communicates a credit request by the core 102 to the credit translation logic 206). Alternatively, the core credit request signal 209 may be provided directly from the core 102 to the credit translation logic 206, rather than through the decode logic 202.

As illustrated in FIG. 2, the credit translation logic 206 may communicate with uncore 210. Generally, uncore (210) includes one or more components of a computing system (whether or not on the same die) that exclude the core(s). For example with respect to FIG. 1, the uncore 210 may include any components 103 through 114. Accordingly, in one embodiment, uncore 210 refers to various components of the shared cache 106 and/or system logic that may be in communication with the shared cache 106 (such as discussed with reference to FIGS. 1, 7, and 8). The credit translation logic 206 may receive return credit information regarding each bank of the shared cache (106) through various signals (e.g., signals 212 through 214). Additionally, the credit translation logic 206 may send physical credit information (e.g., corresponding to the credit request information received from the core 102) to the uncore 210 through a physical credit signal 216.

The credit translation logic 206 may also provide credit return information to the core 102 via a signal 218. Further details regarding the operation of an embodiment of the credit translation logic 206 will be discussed with reference to FIG. 3. In one embodiment, the ADCT 103 may optionally include a multiplexer 220 to combine the signals 212 through 214, with credit return information provided by the credit translation logic 206, to provide the credit return signal 218 to the core 102. In such an embodiment, the signal 218 may include information regarding credits returned to the core 102, together with information from the uncore 210 (e.g., acknowledgment and/or response information).

Figure 3:
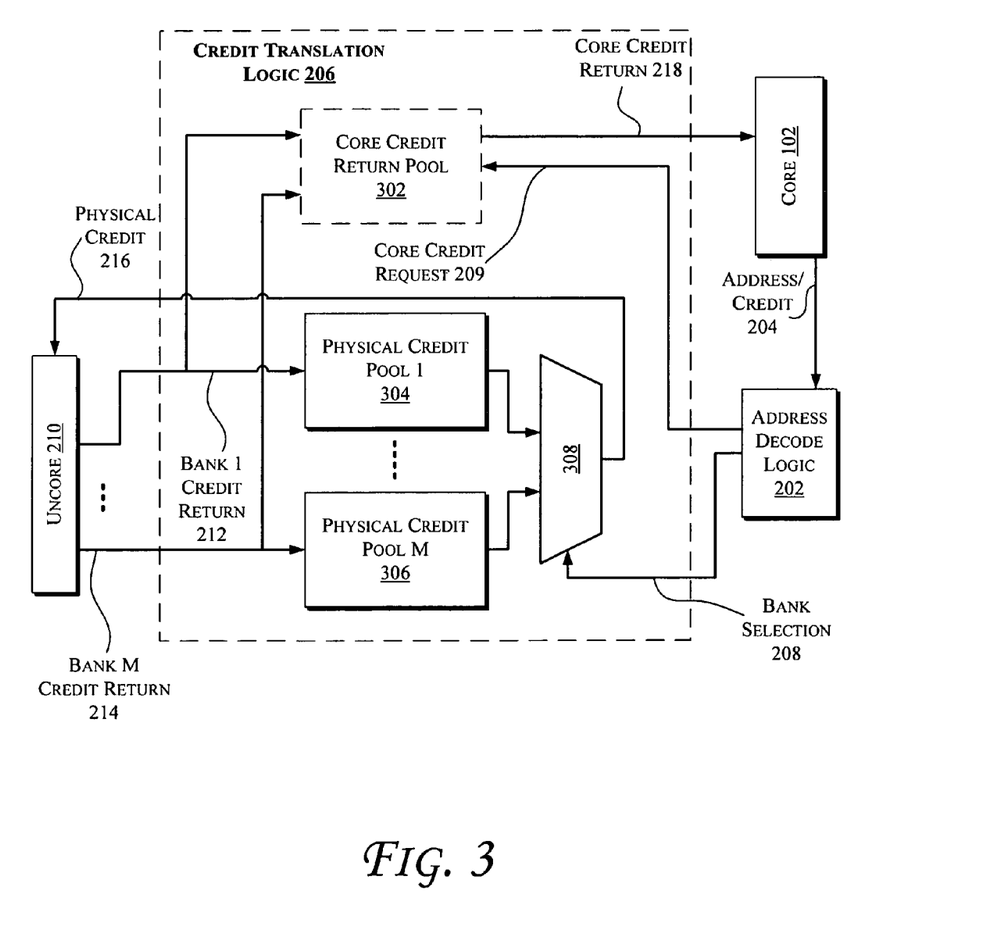
FIG. 3 illustrates a block diagram of a credit translation logic, according to an embodiment.

FIG. 3 illustrates a block diagram of a credit translation logic, according to an embodiment. In one embodiment, FIG. 3 illustrates further details of an embodiment of the credit translation logic 206 of FIG. 2. The credit translation logic 206 may include an optional core credit return pool 302 (e.g., to store information regarding credits consumed by the core 102) and one physical credit pool for each bank of shared cache (e.g., where credit pools 304 through 306 correspond to banks 1 through M of shared cache 106 of FIG. 1). The core credit return pool 302 may store information regarding virtual credits which may be visible to the core 102 or, in one embodiment, may store one or more identifiers. The identifiers stored in the core credit return pool 302 may be credit identification numbers in an embodiment. In one embodiment, the core credit return pool 302 may store information regarding credits which may be unavailable to the core 102, for example, because the credits are already used by the core 102 and/or the credit translation logic 206 is holding back the credits (e.g., to wait for other events to occur, to synchronize operations, etc.). As shown in FIG. 3, the credit translation logic 206 may also include a multiplexer 308 that communicates with the physical credit pools 304 through 306 (where the address decode logic 202 provides the selection signal 208 to the multiplexer 308) to provide the appropriate physical credit from the credit pools 304 through 306 (e.g., via signal 216) to the uncore 210. Further operational details of components of FIG. 3 will be discussed with reference to FIGS. 4 and 5.

Figure 4:
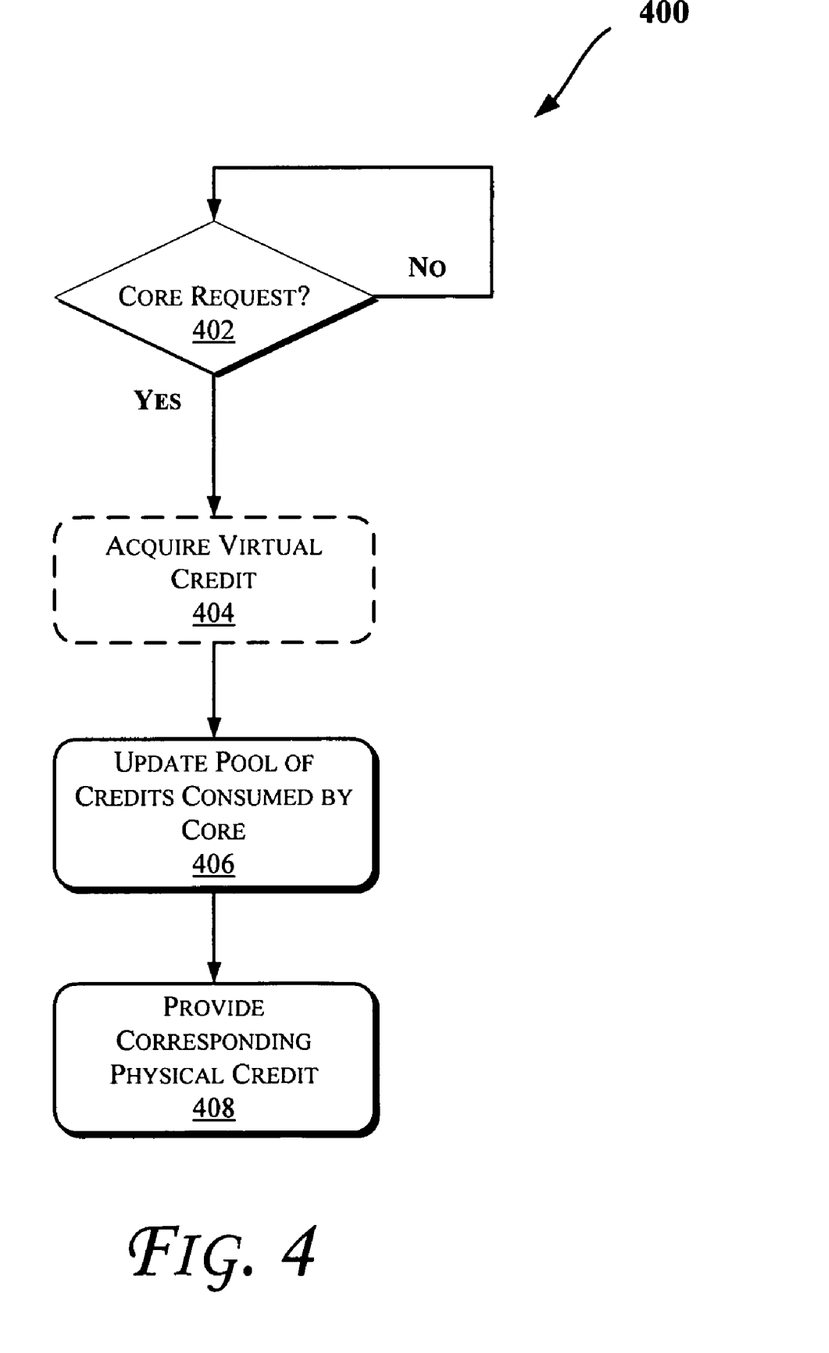
FIG. 4 illustrates a flow diagram of a method to translate a virtual credit request by a processor core into a physical credit, according to an embodiment.

FIG. 4 illustrates a flow diagram of a method 400 to translate a virtual credit request by a processor core into a physical credit, according to an embodiment. In one embodiment, the operations of the method 400 may be performed by one or more of components of a processor, such as the components discussed with reference to FIGS. 1-3.

Referring to FIGS. 1-4, once the core 102 issues a credit request (e.g., via signal 204) at operation 402, the core 102 may acquire a virtual credit (404) from the corresponding credit pool (104). In one embodiment, operation 404 may be optional as the credit translation logic 206 may provide logic to perform credit management tasks without utilizing credit mechanisms within the cores 102. In such an embodiment, the core credit return pool 302 may be replaced by a counter. Other storage mechanisms may also be used such as a hardware register or a variable stored in a shared memory (such as the cache 108). Hence, the credit translation logic 206 may perform various tasks discussed herein that are associated with issuing and returning credits.

At operation 406, the credit translation logic 206 may update the core credit return pool 302 to store information corresponding to one or more credits consumed by the processor core 102. For example, the core credit return pool 302 may store the identifiers or information regarding virtual credits (402) such as discussed with reference to FIG. 3. At operation 408, the credit translation logic 206 provides a corresponding physical credit from a corresponding physical credit pool (e.g., pools 304 through 306) based on the bank selection signal 208 generated by the address decode logic 202. Hence, the credit translation logic 206 may translate the virtual credit request (204) of operation 402 into a corresponding physical credit (216) at operation 408. As discussed with reference to FIG. the physical credit (216) may correspond to one the banks of shared cache (106). Also, the physical credit (216) may be used to identify a physical entry of the cache 108, e.g., to enable the core 102 to read or write data from/to that entry.

Figure 5:
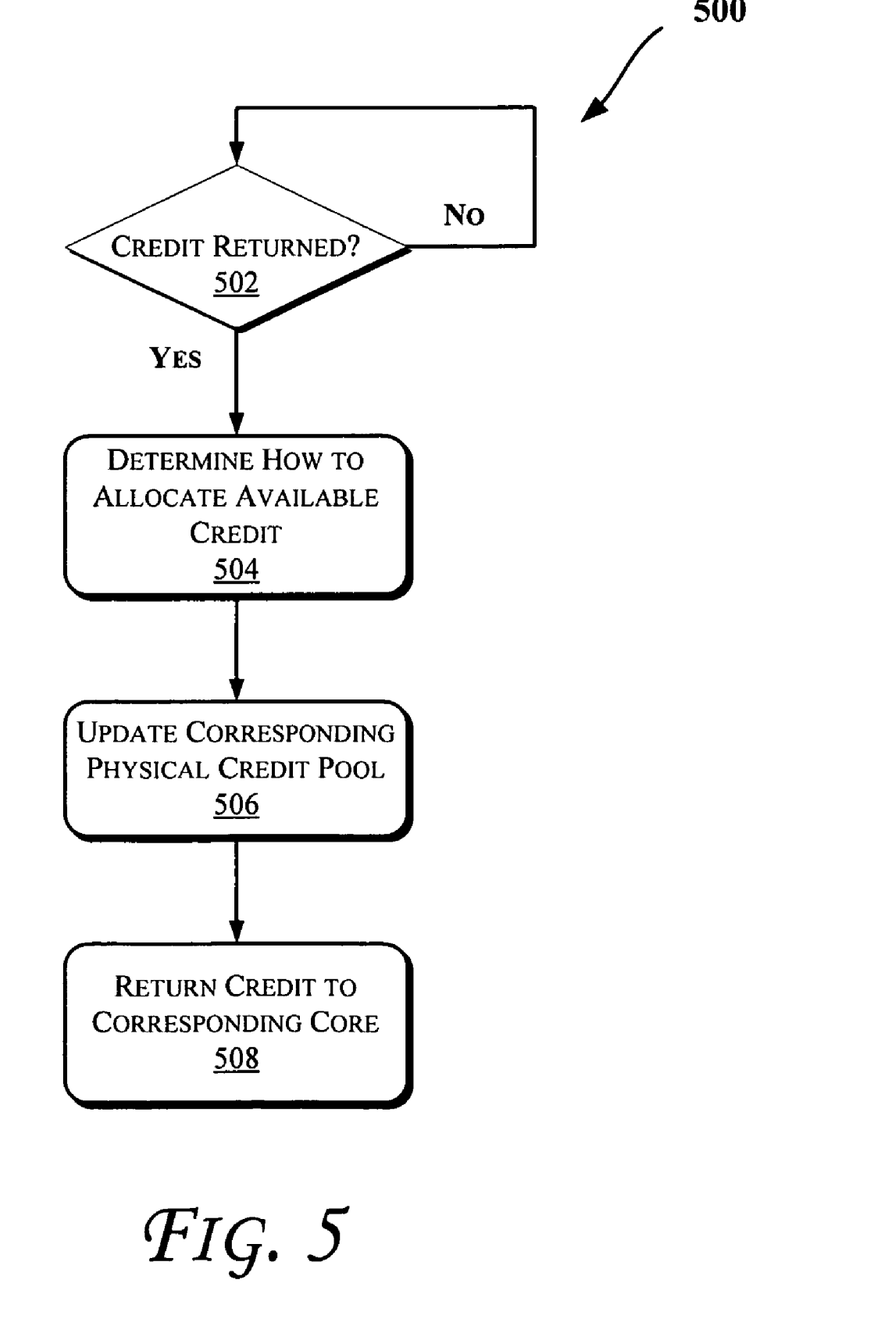
FIG. 5 illustrates a flow diagram of a method to return an available credit to a processor core, according to an embodiment.

FIG. 5 illustrates a flow diagram of a method 500 to return an available credit to a processor core, according to an embodiment. In one embodiment, the operations of the method 500 may be performed by one or more components of a processor, such as the components discussed with reference to FIGS. 1-3.

Referring to FIGS. 1-5, once a component of the uncore 210 (such as the scheduling logic 110 and/or the DCRS logic 112) returns an available (or freed) credit to the credit translation logic 206 (e.g., via signals 212 through 214) at operation 502, the DCRS logic 112 may determine how to allocate the available credit at an operation 504.

Various techniques may be utilized to determine how to allocate available credits at operation 504. For example, as discussed with reference to FIG. 1, the DCRS 112 may have access to a credit table 114 (that may be shared by banks of the shared cache 106 in one embodiment). The credit table 114 may keep track of credits allocated to each of the cores 102. The credit table 114 may be updated each time an entry allocation or deallocation occurs, as will be further discussed with reference to FIG. 6.

Table 1 illustrates sample values that may be stored in the credit table 114. In one embodiment, such as indicated by Table 1, a free credit return pointer may be utilized to point to the entry with the least free credit count. Other credit schemes which take the core's demands into account may be utilized, such as those taking misses per core (102) into account to balance workload distribution among the cores 102. In an embodiment, a non-uniform cache access (NUCA) optimization may be utilized that may allocate more free credits for local cores compared with remote cores, for example. Remote cores generally refers to cores that are relatively farther from the shared cache 106 than local cores on the same die. Remote cores may also refer to cores that are off the same die as the shared cache 106 and share the same socket.

TABLE 1

Sample Entries for Credit Table

| | Core | | |
|---|---|---|---|
| | 1 | 2 | 3 |
| Free Credit Count | 4 | 2 | 3 |
| Free Credit Return Pointer | | ∧ | |

In one embodiment, each core (102) may at anytime consume more than what that core was initially allotted. Also, the free credit count of each entry may not exceed an initial allotted value even though the core may at anytime consume more credits. In one embodiment, the DCRS logic 112 may implement a state machine to allocate and/or deallocate entries in the credit table 114, as will be further discussed with reference to FIG. 6.

At initialization, the credit table 114 may have various configurations. For example, one of the following may be utilized:

Balanced Workload: equal amount of free credits per core;
NUCA Optimization: more credits may be allocated to the local cores and less credits for remote cores; or
Remote Latency Optimization: remote cores may receive more credit allocation, e.g., to hide latency incurred by additional remote latency.

Table 2 shows an example of credit initialization values for a 32 entry credit table (114), according to various embodiments.

TABLE 2

Sample Initialization Values for Credit Table

| | Initial Free Credit Per Core | |
|---|---|---|
| | Local Cores | Remote Cores |
| Balanced Workload | 4 | 4 |
| NUCA Optimization | 6 | 2 |
| Remote Latency Optimization | 2 | 6 |

Referring to FIGS. 1-5, at an operation 506, the credit translation logic 206 may update the corresponding physical credit pool (e.g., one of the pools 304 through 306). The credit translation logic 206 may then return the credit (for example, via signal 218 to the core) at an operation 508. The credits returned from the uncore 210 (e.g., via signals 212 through 214) may be utilized to update the corresponding physical credit pool (e.g., pools 304 through 306). Signals 212 through 214 may also be provided to the core credit return pool 302, so that the core credit return pool 302 returns a credit to the core 102 (for instance, via signal 218).

Figure 6:
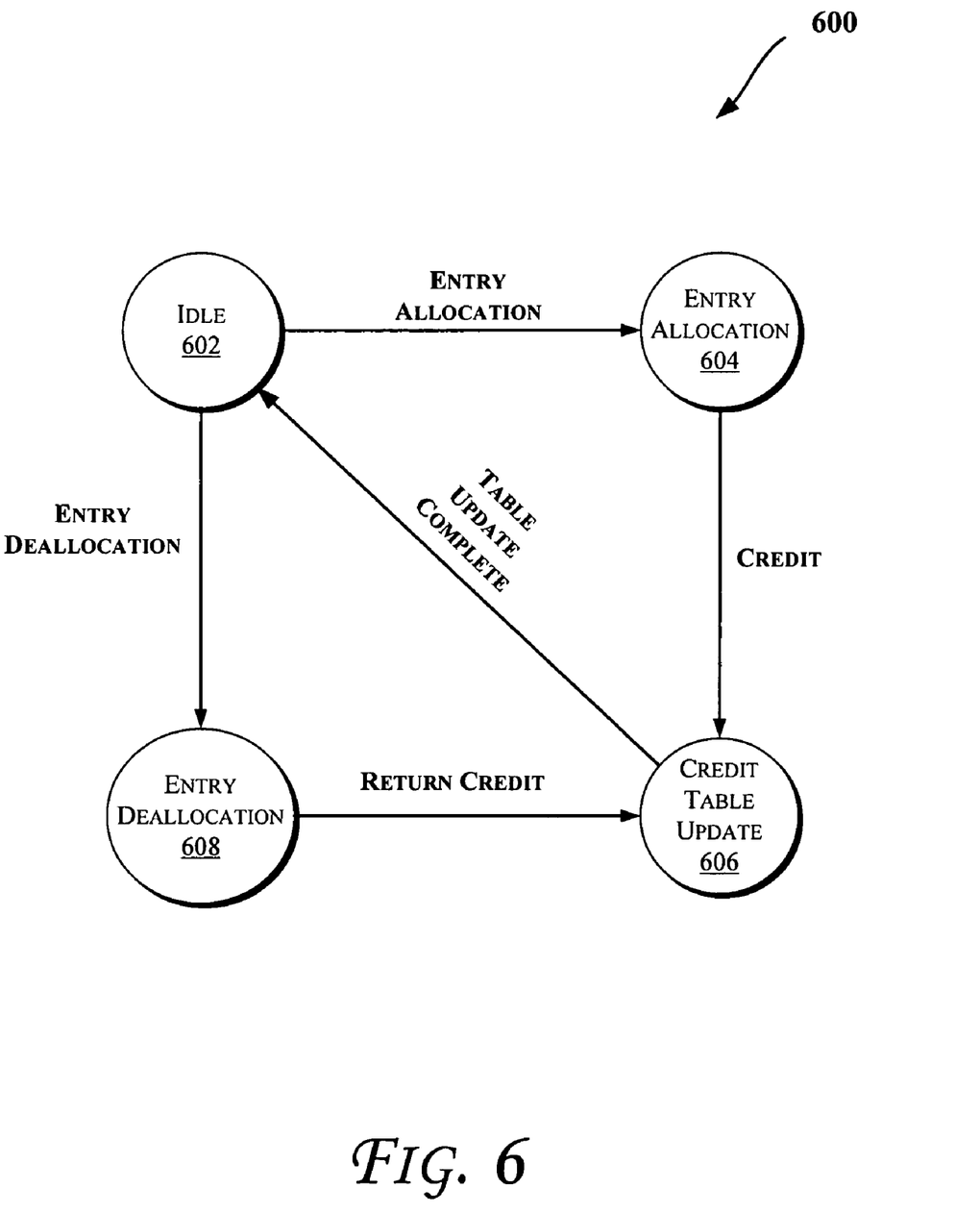
FIG. 6 illustrates a block diagram of a state machine, according to an embodiment.

FIG. 6 illustrates a block diagram of a state machine 600, according to an embodiment. In one embodiment, the state machine 600 may be implemented by the DCRS logic 112 of FIG. 1, e.g., to allocate and/or deallocate entries within the credit table 114 of FIG. 1. The state machine 600 includes an idle state 602. Upon an entry allocation event (e.g., upon receiving a credit request from one of the cores 102 of FIG. 1, such as discussed with reference to operation 402 of FIG. 4), the machine 600 enters an entry allocation state 604. After the state 604, the machine 600 enters a credit table update state 606 where a credit is removed from the credit table 114 in response to a credit request, e.g., at operation 402 of FIG. 4 by decreasing the free entry count of the core that requested the entry allocation in the credit table 114. As discussed with reference to Table 1, the free credit return pointer may be updated at the state 606. After the state 606, the machine 600 returns to its idle state 602.

Upon an entry deallocation event (e.g., upon receiving a credit return such as discussed with reference to operation 502 of FIG. 5), the machine 600 enters an entry deallocation state 608. After the state 608, the machine 600 returns to the credit table update state 606 where a credit is returned to one of the cores 102, e.g., by utilizing the free credit return pointer of Table 1. The state 606 may also increase the free entry count of the core that is allocated the available credit in the credit table 114. After the state 606, the machine 600 returns to its idle state 602.

Figure 7:
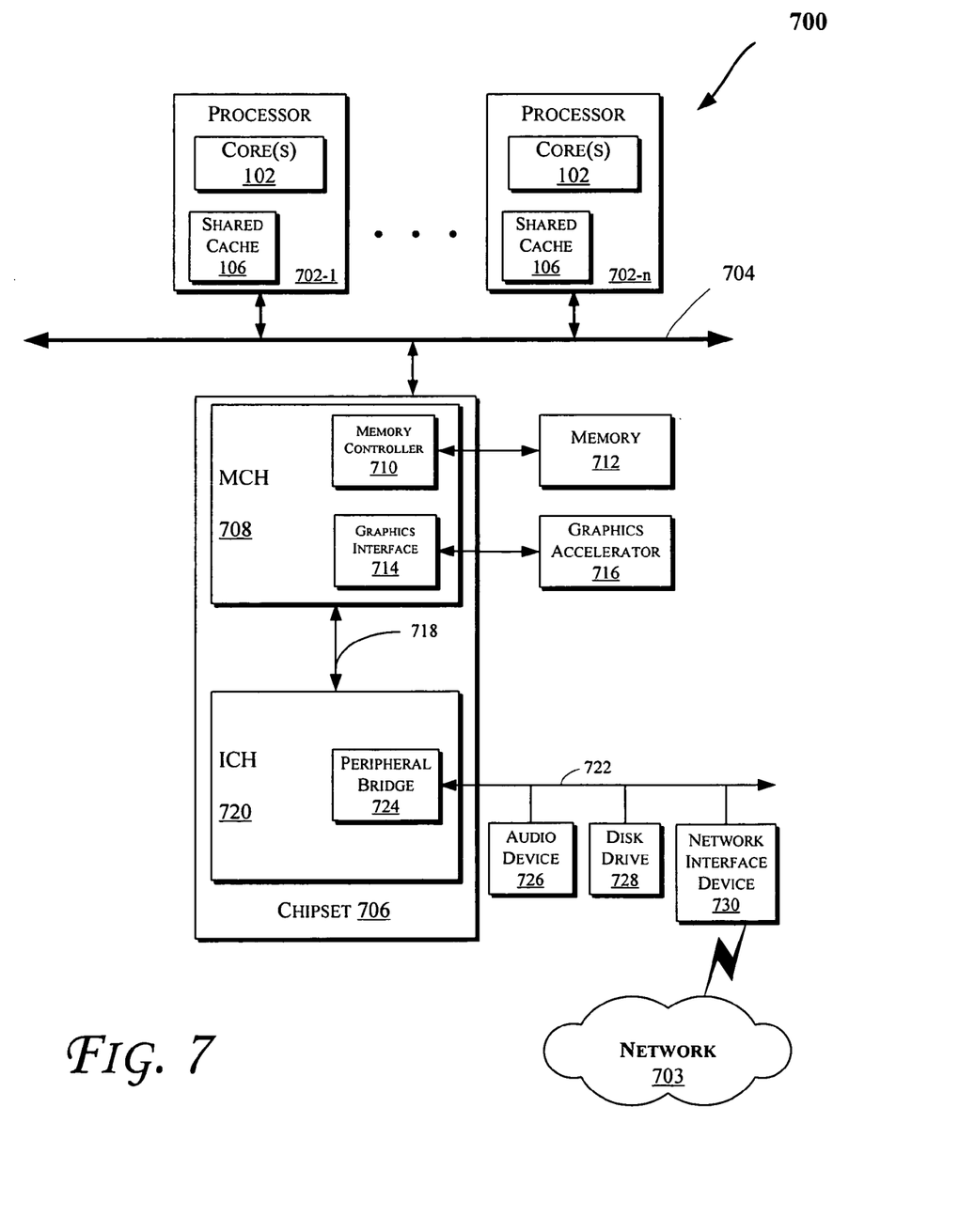
FIGS. 7 and 8 illustrate block diagrams of computing systems in accordance with various embodiments of the invention.

FIG. 7 illustrates a block diagram of a computing system 700 in accordance with an embodiment of the invention. The computing system 700 may include one or more central processing unit(s) (CPUs) 702 or processors that communicate via an interconnection network (or bus) 704. The processors (702) may include a general purpose processor, a network processor (that processes data communicated over a computer network 703), or types of a processor (including a reduced instruction set computer (RISC) processor or a complex instruction set computer (CISC)). Moreover, the processors (702) may have a single or multiple core design.

The processors (702) with a multiple core design may integrate different types of processor cores on the same integrated circuit (IC) die. Also, the processors (702) with a multiple core design may be implemented as symmetrical or asymmetrical multiprocessors. In an embodiment, one or more of the processors 702 may be the same or similar to the processor 100 of FIG. 1. For example, one or more of the processors 702 may include one or more of the cores 102 and/or shared cache 106. Also, the operations discussed with reference to FIGS. 1-6 may be performed by one or more components of the system 700.

A chipset 706 may also communicate with the interconnection network 704. The chipset 706 may include a memory control hub (MCH) 708. The MCH 708 may include a memory controller 710 that communicates with a memory 712. The memory 712 may store data, including sequences of instructions that are executed by the CPU 702 or any other device included in the computing system 700. In one embodiment of the invention, the memory 712 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 704, such as multiple CPUs and/or multiple system memories.

The MCH 708 may also include a graphics interface 714 that communicates with a graphics accelerator 716. In one embodiment of the invention, the graphics interface 714 may communicate with the graphics accelerator 716 via an accelerated graphics port (AGP). In an embodiment of the invention, a display (such as a flat panel display) may communicate with the graphics interface 714 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 718 may allow the MCH 708 and an input/output control hub (ICH) 720 to communicate. The ICH 720 may provide an interface to I/O devices that communicate with the computing system 700. The ICH 720 may communicate with a bus 722 through a peripheral bridge (or controller) 724, such as a peripheral component interconnect (PCI) bridge, a universal serial bus (USB) controller, or other types of peripheral bridges or controllers. The bridge 724 may provide a data path between the CPU 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 722 may communicate with an audio device 726, one or more disk drive(s) 728, and a network interface device 730 (which is in communication with the computer network 703). Other devices may communicate via the bus 722. Also, various components (such as the network interface device 730) may communicate with the MCH 708 in some embodiments of the invention. In addition, the processor 702 and the MCH 708 may be combined to form a single chip. Furthermore, the graphics accelerator 716 may be included within the MCH 708 in other embodiments of the invention.

Furthermore, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media that are capable of storing data in electronic format (including instructions).

Figure 8:
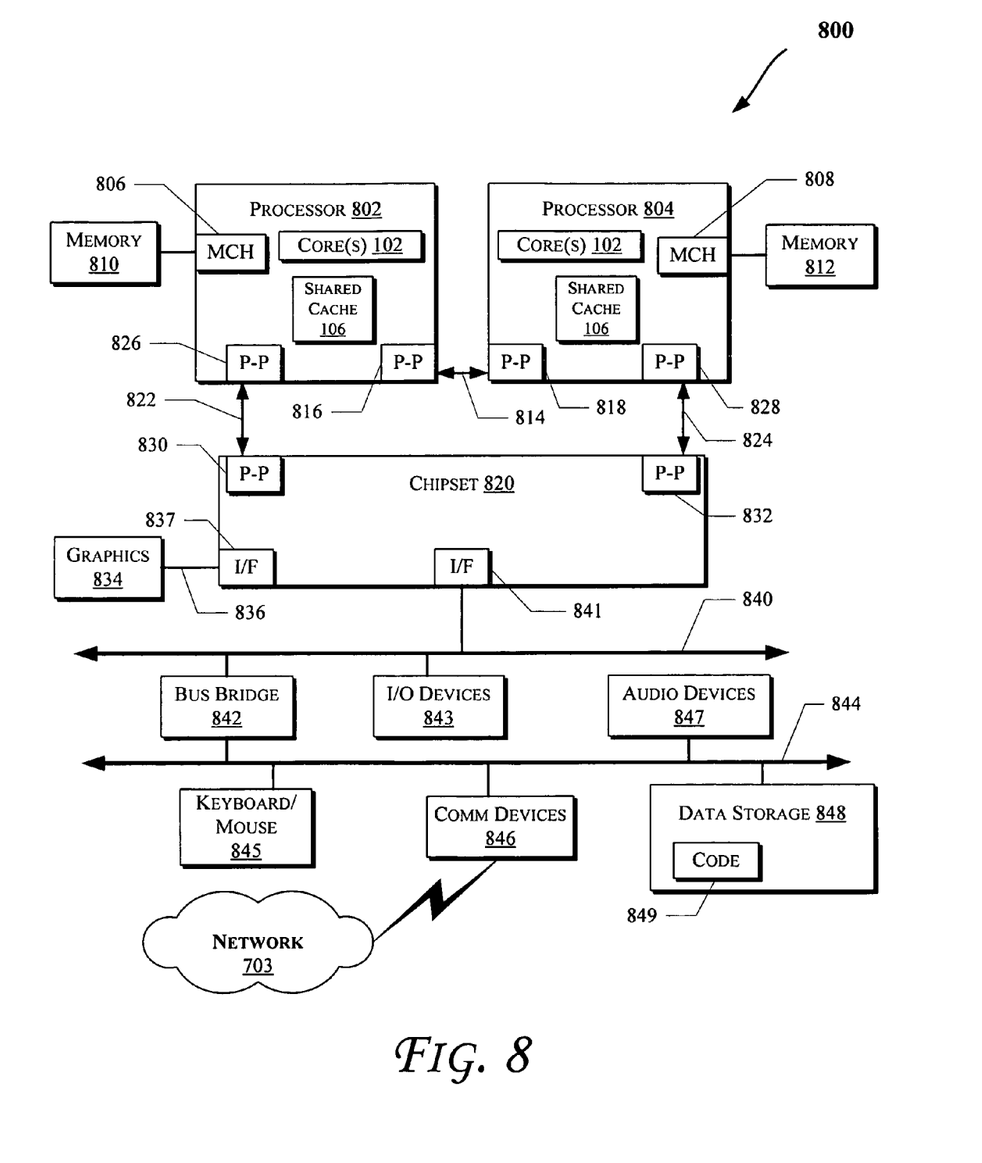

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-6 may be performed by one or more components of the system 800.

As illustrated in FIG. 8, the system 800 may include several processors, of which only two, processors 802 and 804 are shown for clarity. The processors 802 and 804 may each include a local memory controller hub (MCH) 806 and 808 to enable communication with memories 810 and 812. The memories 810 and/or 812 may store various data such as those discussed with reference to the memory 712.

In an embodiment, the processors 802 and 804 may be one of the processors (702) discussed with reference to FIG. 7. The processors 802 and 804 may exchange data via a point-to-point (PtP) interface 814 using PtP interface circuits 816 and 818, respectively. The processors 802 and 804 may each exchange data with a chipset 820 via individual PtP interfaces 822 and 824 using point to point interface circuits 826, 828, 830, and 832. The chipset 820 may also exchange data with a high-performance graphics circuit 834 via a high-performance graphics interface 836, using a PtP interface circuit 837.

At least one embodiment of the invention may be provided within the processors 802 and 804. For example, one or more of the cores 102 and/or shared cache 106 of FIG. 1 may be located within the processors 802 and 804. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8.

The chipset 820 may communicate with a bus 840 using a PtP interface circuit 841. The bus 840 may have one or more devices that communicate with it, such as a bus bridge 842 and I/O devices 843. Via a bus 844, the bus bridge 843 may communicate with other devices such as a keyboard/mouse 845, communication devices 846 (such as modems, network interface devices, or other communication devices that may communicate with the computer network 703), audio I/O device, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-8.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
a credit translation logic coupled between a processor core and one or more banks of shared cache to translate a credit requested by the processor core into a physical credit that corresponds to one of the one or more banks of shared cache.

2. The apparatus of claim 1, further comprising a credit return logic to determine whether to allocate an available credit to the processor core.

3. The apparatus of claim 2, further comprising a credit table coupled to the credit return logic to store credits available to the processor core.

4. The apparatus of claim 1, wherein the credit translation logic comprises one or more physical credit pools and wherein each of the one or more physical credit pools corresponds to one of the one or more banks of shared cache.

5. The apparatus of claim 1, wherein the credit translation logic comprises a core credit return pool to store information that corresponds to one or more credits consumed by the processor core.

6. The apparatus of claim 1, further comprising an interconnection to couple the credit translation logic and the one or more banks of the shared cache.

7. The apparatus of claim 1, further comprising an address decode logic to decode an associated address of a request issued by the processor core.

8. The apparatus of claim 7, wherein the address decode logic is coupled between the processor core and the one or more banks of shared cache.

9. The apparatus of claim 1, wherein the processor core and the one or more banks of shared cache are on a same die.

10. The apparatus of claim 9, wherein the die comprises a plurality of processor cores and wherein each of the plurality of processor cores is coupled to the one or more banks of the shared cache.

11. The apparatus of claim 10, wherein each of the plurality of processor cores is coupled to the one or more banks of shared cache via a respective credit translation logic.

12. The apparatus of claim 1, further comprising an interconnection, wherein the processor core is coupled to the interconnection via the credit translation logic.

13. The apparatus of claim 1, wherein the processor core comprises a credit pool to store information that corresponds to one or more credits of the processor core.

14. A method comprising:
receiving a credit request from a processor core; and
translating the credit request into a physical credit, the physical credit corresponding to one of one or more banks of shared cache.

15. The method of claim 14, further comprising generating a bank selection signal corresponding to an address provided by the processor core.

16. The method of claim 14, further comprising storing information corresponding to one or more credits consumed by the processor core.

17. The method of claim 14, further comprising acquiring a credit from a credit pool of the processor core.

18. The method of claim 14, further comprising determining how to allocate an available credit to one of a plurality of processor cores.

19. The method of claim 14, further comprising updating a physical credit pool when a scheduling logic returns an available credit.

20. The method of claim 14, further comprising initializing a credit table that stores core credit allocations in accordance with one or more of a balanced workload configuration, a NUCA optimization, or a remote latency optimization.

21. The method of claim 14, further comprising reading or writing data to one of the one or more banks shared cache based on the physical credit.

22. A system comprising:
a first logic to generate a bank selection signal based on a request from a processor core;
a second logic to send a physical credit to one or more banks of shared cache based on the bank selection signal; and
an interconnection to couple the processor core to the one or more banks of shared cache.

23. The system of claim 22, wherein the processor core is coupled to the one or more banks of shared cache through the first logic and the second logic.

24. The system of claim 22, further comprising a third logic to decode the request from the processor core to generate a core credit request.

25. The system of claim 22, wherein each of the banks of shared cache comprises a credit return logic to determine whether to allocate a returned credit from an uncore to the processor core.

26. The system of claim 22, further comprising one or more physical credit pools, wherein each of the one or more physical credit pools corresponds to one of the one or more banks of shared cache.

27. The system of claim 22, further comprising a credit table to store credits available to the processor core.

28. The system of claim 22, further comprising an audio device.

29. The system of claim 22, wherein the processor core and the one or more banks of shared cache are on a same die.

30. The system of claim 22, wherein each of the one or more banks of shared cache comprises a static random access memory.

* * * * *

UNITED STATES PATENT AND TRADEMARK OFFICE
CERTIFICATE OF CORRECTION

| | | |
|---|---|---|
| PATENT NO. | : 7,353,338 B2 | Page 1 of 1 |
| APPLICATION NO. | : 11/302646 | |
| DATED | : April 1, 2008 | |
| INVENTOR(S) | : Liu et al. | |

It is certified that error appears in the above-identified patent and that said Letters Patent is hereby corrected as shown below:

In column 10, line 42, in Claim 21, after "banks" insert -- of --.

Signed and Sealed this

Second Day of September, 2008

JON W. DUDAS
*Director of the United States Patent and Trademark Office*